(12) United States Patent
DeFrancisci et al.

(10) Patent No.: US 6,495,183 B2
(45) Date of Patent: Dec. 17, 2002

(54) COOKING LIQUID TREATMENT METHOD

(75) Inventors: Leonard DeFrancisci, Vero Beach, FL (US); Leonard J. DeFrancisci, West Melbourne, FL (US); Donald Floyd Hoskins, Melbourne, FL (US); Darius Korzeniowski, Indialantic, FL (US)

(73) Assignee: Howden Food Equipment Corp., Melbourne, FL (US)

( * ) Notice: Subject to any disclaimer, the term of this patent is extended or adjusted under 35 U.S.C. 154(b) by 0 days.

(21) Appl. No.: 09/990,782

(22) Filed: Nov. 14, 2001

(65) Prior Publication Data

US 2002/0031585 A1 Mar. 14, 2002

Related U.S. Application Data

(63) Continuation-in-part of application No. 09/935,270, filed on Aug. 22, 2001.
(60) Provisional application No. 60/227,561, filed on Aug. 23, 2000.

(51) Int. Cl.⁷ .................................................. A23L 1/00
(52) U.S. Cl. ........................................ 426/509; 426/523
(58) Field of Search ................................. 426/509, 438, 426/520, 523; 99/330, 404, 407, 470

(56) References Cited

U.S. PATENT DOCUMENTS

| | | |
|---|---|---|
| 3,614,924 A | 10/1971 | Hickey |
| 3,927,976 A | 12/1975 | Reimers et al. |
| 3,982,481 A | 9/1976 | Console et al. |
| 4,152,975 A | 5/1979 | Jones |
| 4,155,293 A | 5/1979 | Spiel et al. |
| 4,181,072 A | 1/1980 | Hirahara |
| 4,214,013 A | 7/1980 | Hirahara |
| 4,571,341 A | 2/1986 | Sugimura |
| 4,582,047 A | 4/1986 | Williams |
| 4,752,491 A | 6/1988 | D'Alterio et al. |
| 4,754,699 A | 7/1988 | Cope et al. |
| 4,787,300 A | 11/1988 | Mette |
| 4,899,648 A | 2/1990 | Fast |
| 5,052,287 A | 10/1991 | Chiang |
| 5,134,926 A | 8/1992 | De Francisci |
| 5,137,740 A | 8/1992 | Benson et al. |
| 5,167,979 A | 12/1992 | Benson et al. |
| 5,294,452 A | 3/1994 | De Francisci |
| 5,493,956 A | 2/1996 | Larsen |
| 5,546,849 A | * 8/1996 | Shefet .................... 99/330 |
| 5,560,952 A | 10/1996 | Miller et al. |

(List continued on next page.)

FOREIGN PATENT DOCUMENTS

GB       1 248 629       10/1971

OTHER PUBLICATIONS

The Canning Trade, Inc. A Complete Course in Canning, Library of Congress Catalog Card No.: 46–19487, 1981, pp. 297–302, The Canning Trade, Inc., Baltimore, MD.

(List continued on next page.)

Primary Examiner—George C. Yeung
(74) Attorney, Agent, or Firm—Allen, Dyer, Doppelt, Milbrath & Gilchrist, P.A.

(57) ABSTRACT

A method for treating used cooking liquid from a cooking process includes the steps of removing a portion of the used liquid cooking medium from a cooking vessel and channeling it to a treatment vessel. The treatment vessel is sealable against a pressure that is substantially greater than atmospheric pressure. The cooking medium in the treatment vessel is then subjected to a pressure substantially greater than ambient atmospheric pressure, and it is heated in the treatment vessel to a temperature greater than an atmospheric pressure boiling point for a sufficient time to restore the cooking medium to a condition suitable for cooking. Finally the treated cooking medium is returned to the cooking vessel from the treatment vessel. This method is environmentally useful for significantly reducing wastewater production and "makeup" water usage.

18 Claims, 2 Drawing Sheets

U.S. PATENT DOCUMENTS

| | | | |
|---|---|---|---|
| 5,619,908 A | 4/1997 | Catelli et al. |
| 5,664,482 A | 9/1997 | Graham et al. |
| 5,824,187 A | 10/1998 | Ricter et al. |
| 5,972,407 A | 10/1999 | Hsu |
| 6,058,828 A | 5/2000 | Wei et al. |

OTHER PUBLICATIONS

Casadei, M.A., The Use of High Hydrostatic Pressure in Food Microbiology–A Review, Review No. 21, 2000, pp. 1–54, Campden and Chorleywood Food Research Association, Gloucestershire, UK.

Atherton, D., Process Control in Hydrostatic Cookers Part 1, Validification of Cooker Operating Conditions, Technical Manual No. 5, Nov., 1981, pp. 1–19, Appendix 1 pp. 3, and Appendix 2 (Figs. 1–3), Campden and Chorleywood Food Research Association, Gloucestershire, UK.

Austin, G., Process Control in Hydrostatic Cookers Part 3. Guidolines on Emergency Procedures, Technical Manual No. 5, Aug., 1984, pp. 1–23, Campden and Chorleywood Food Research Association, Gloucestershire, UK.

Process Control in Hydrostatic Cookers Part 2. Factors Affecting Heat Penetration Ratos, Technical Manual No. 5, Jun., 1984, pp. 1–124, Campden and Chorleywood Food Research Association, Gloucestershire, UK.

Roto Cookers–Coolers, Lyco Product Brochure, Acknowledged Prior Art.

Double–Drum Screens, Lyco Product Brouchure, Acknowledged Prior Art.

* cited by examiner-

COOKING LIQUID TREATMENT METHOD

CROSS-REFERENCE TO RELATED APPLICATION

This application is a continuation-in-part of utility application Ser. No. 09/935,270, entitled "Continuous Cooking Apparatus and Method Employing Hydrostatic Pressure," filed Aug. 22, 2001, which itself claims priority from provisional application No. 60/227,561, entitled "Continuous Cooking Apparatus and Method Employing Hydrostatic Pressure for Enhancing Cooking Temperatures and Time," filed Aug. 23, 2000.

FIELD OF INVENTION

The present invention relates to an apparatus and method for treating used cooking liquid resulting from the cooking of food products and, in particular, to such a treatment using increased hydrostatic pressure on the used cooking liquid to minimize the amount of effluent and the use of "makeup" liquid.

BACKGROUND OF THE INVENTION

Cooking of foods in a heated liquid typically requires the liquid within which the food is being cooked to combine with the food as well as provide a cooking temperature sufficient for completing the cooking process. By way of example, when cooking food products such as pasta, rice, legumes, or vegetables, large amounts of water are absorbed during the cooking process, with the weight of the cooked food generally increasing to 250% of the original dry weight for pasta, for instance.

Not all the cooking water is absorbed, however, and the nonabsorbed water typically contains a residue from the food, such as starch from pasta or legumes, that interferes with the cooking of additional food and is also detrimental to product quality. During the production process, this wastewater ultimately must be drained off, with additional "makeup" water added to the cooking vessel as needed to maintain a desired volume.

The disposal of the wastewater is becoming of increasing concern for food manufacturers, as is the use of fresh water in the production process. The concern arises both from economic considerations, since disposal typically entails the payment of a surcharge, and the "makeup" water incurs additional costs, and from ecological considerations of treating of the wastewater and using excess water.

SUMMARY OF THE INVENTION

It is an object of the present invention to provide an apparatus and method for treating used cooking liquid from a cooking process.

It is also an object to provide such an apparatus and method for reducing a requirement for cooking fluid.

It is an additional object to provide such an apparatus and method for pretreating food to minimize the production of wastewater and usage of "makeup" water.

It is a further object is to provide such an apparatus and method that assist in reducing potential microbial contamination.

It is another object to provide such an apparatus and method for improving a quality of the cooked foodstuff.

These and other objects are achieved by the present invention, one aspect of which comprises a method for treating used cooking liquid from a cooking process. The method comprises the steps of removing a portion of used liquid cooking medium from a cooking vessel and channeling the portion of cooking medium to a treatment vessel. The cooking medium in the treatment vessel is then subjected to a pressure substantially greater than ambient atmospheric pressure, and it is heated in the treatment vessel to a temperature greater than an atmospheric pressure boiling point for a sufficient time to restore the cooking medium to a condition suitable for cooking. Finally the treated cooking medium is returned to the cooking vessel from the treatment vessel.

It will be understood by one of skill in the art that the treatment vessel may in fact be integral to the cooking vessel, but sealable for attaining increased pressure and temperature, and thus that the "channeling" may comprise flowing liquid from the cooking vessel into a treatment sector for pressurization and heating.

The system of the present invention comprises a treatment vessel sealable against a pressure that is substantially greater than atmospheric pressure. Means are provided for automatically channeling a portion of used liquid cooking medium between a cooking vessel and the treatment vessel. Means are also provided for heating the cooking medium in the treatment vessel when sealed to a temperature greater than an atmospheric pressure boiling point. The heating should persist for a sufficient time to restore the cooking medium to a condition suitable for cooking, and should cause a rise in pressure to a treatment level substantially greater than atmospheric pressure.

BRIEF DESCRIPTION OF DRAWING

Embodiments of the invention are described, by way of example, with reference to the accompanying drawings in which.

DETAILED DESCRIPTION OF THE PREFERRED EMBODIMENTS

Figure 1:
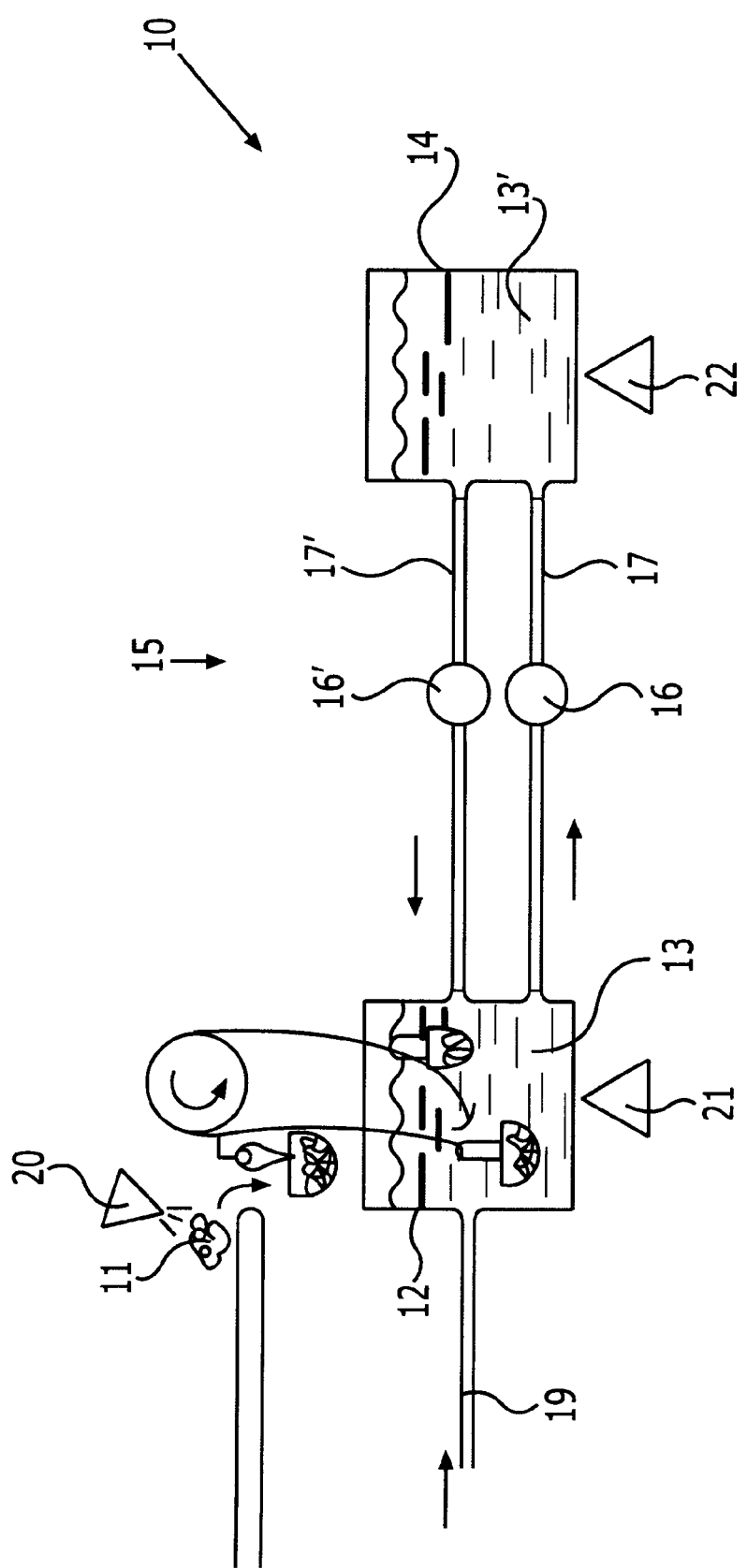
FIG. 1 is a schematic diagram of an exemplary system of the present invention.
Figure 2:
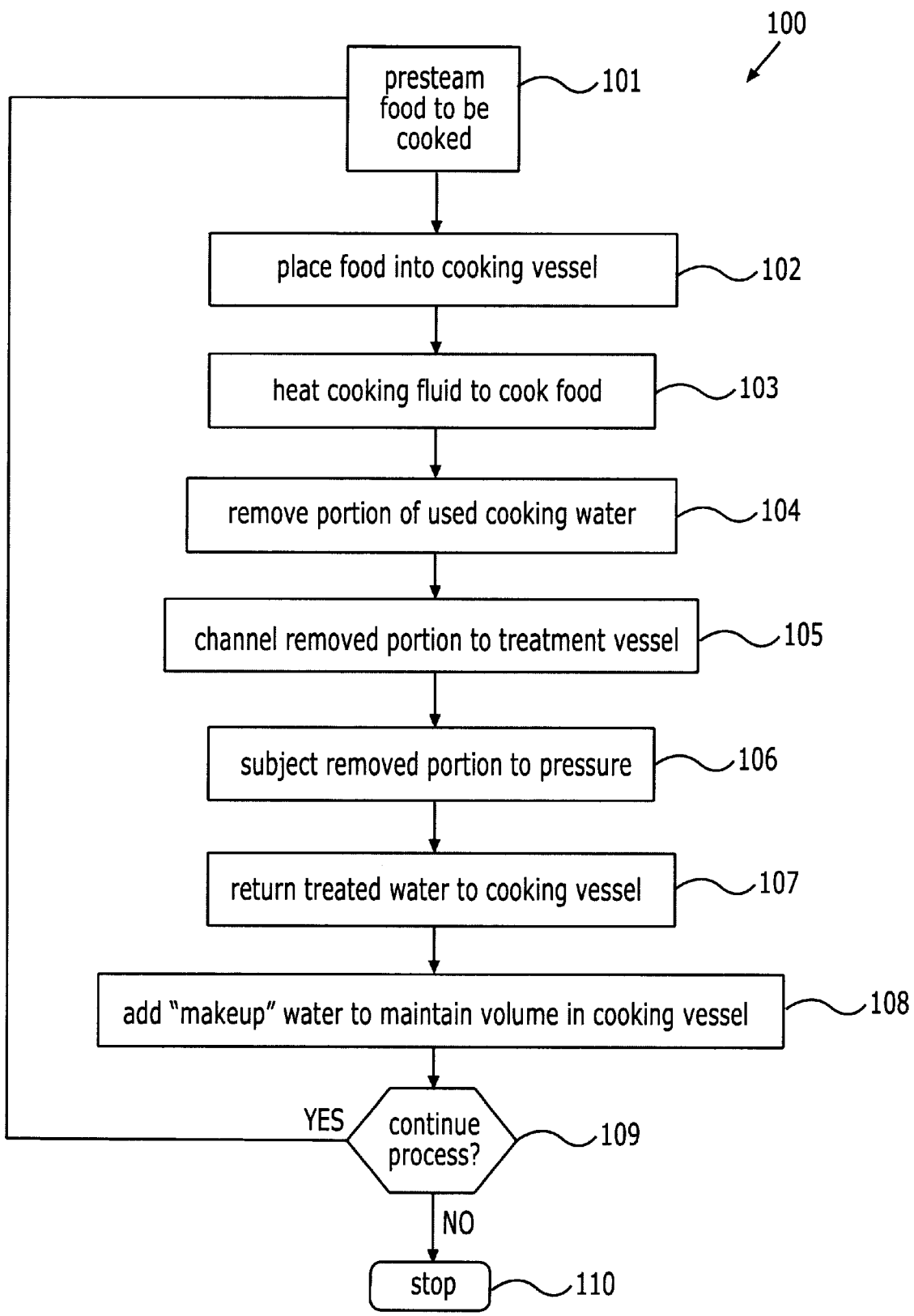
FIG. 2 is a flowchart of the method of the present invention.

The present invention will now be described more fully with reference to FIGS. 1 and 2. This invention may be embodied in many different forms and should not be construed as limited to the embodiments set forth herein. Rather, these embodiments are provided to convey a scope of the invention to those skilled in the art.

An exemplary embodiment of the present invention comprises a system 10 (FIG. 1) and method 100 (FIG. 2) for treating used cooking water from the cooking of a food containing a complex carbohydrate, such as in the blanching of a pasta, although this is not intended as a limitation. Other such foods may also be contemplated, such as legumes or rice.

The treatment method 100 comprises the steps of placing the food 11 to be cooked into a cooking vessel 12 containing a predetermined amount of liquid cooking medium (block 102), such as, but not intended to be limited to, an aqueous fluid such as water 13 with or without a desired additive such as oil or salt.

Next the fluid is heated with a heater 21 to cook the food 11 (block 103). During the cooking process of a food containing a complex carbohydrate, typically starch will be leached out. The starch will render the cooking water less and less desirable, raising the viscosity and decreasing the quality of the cooked food product. Suspended starches cause loss in weight and throughput of food product and also cause significant cost for treatment of the processing water. As mentioned in the Background, such cooking water will ultimately have to be drained off and replaced with new "makeup" water.

In the present invention, a portion of the used cooking water 13 is removed from the cooking vessel 12 (block 104) and is channeled to a treatment vessel 14 (block 105). The treatment vessel 14 is sealed sufficiently to withstand a pressure substantially above atmospheric, preferably at least 0.25 atm above ambient pressure. In a preferred embodiment the channeling is mediated by a pumping and control system 15 that includes a fluid pump 16 (16') and piping 17 (17') for transferring fluid on a substantially continuous basis from (to) the cooking vessel 12 and to (from) the treatment vessel 14.

It will be understood by one of skill in the art that the "treatment vessel" 14 may comprise any element capable of holding and cycling liquid, and is not meant to imply only an element such as a tank. For example, an element such as piping may be contemplated for use as well. Also, as mentioned above, the treatment vessel 14 may be integral with the cooking vessel 12.

In the treatment vessel 14 the cooking water 13 is subjected to a pressure substantially greater than ambient atmospheric pressure (block 106) by heating the used cooking water 13' in the treatment vessel 14 using a second heater 22 to a temperature greater than its boiling point at atmospheric pressure for a sufficient time to restore the cooking water 13' to a condition 13 suitable for cooking. In the case of blanching pasta, the viscous, starch-laden water, following treatment, becomes less cloudy and significantly less viscous.

An additional benefit of the method 100 and system 10 is that the used cooking water 13' is heated for a sufficient time and to a sufficient temperature to subject it to an environment conducive to reducing a level of microbial contamination therein.

Once treatment is complete, the treated cooking water 13 is returned from the treatment vessel 14 to the cooking vessel 12 (block 107) via return piping 17'. "Makeup" water 19 is added as needed (block 108); however, the amount will be significantly less than in prior art systems, since most of the removed used cooking water is returnable following treatment in the treatment vessel 14. It should be noted that makeup water 19 will also be needed to replace that absorbed by the food during the cooking process.

Another benefit of the present system 10 and method 100 is that energy is substantially conserved during the process (within thermodynamic limits and within the bounds of the construction details of the system 10); that is, the heat that is used to treat the used cooking water 13' is retained and is useful for the subsequent cooking process after returning treated water 13 to the cooking vessel 12.

In large cooking operations, such as commercial blanching, the food placing, used water removing, channeling, subjecting, heating, and returning steps are carried out (block 109) substantially continuously until it is desired to stop (block 110). Alternatively, the cooking process may be in a batch mode, in which case there the food is added and removed in batches.

A further improvement that may be desired for the blanching of pasta comprises pretreating the food 11 to be cooked with steam, introduced, for example, by nozzle 20 (block 101). Pretreatment with steam is also believed to confer a toughening of the product 11, so that an effect of starch in the cooking water is not as deleterious, nor is as much starch released by the cooking food 11.

Many modifications and other embodiments of the invention will come to the mind of one skilled in the art having the benefit of the teachings presented in the foregoing description and drawings. Therefore, it is to be understood that the invention is not to be limited to the specific embodiments disclosed.

What is claimed is:

1. A method for treating used cooking medium from a cooking vessel comprising the steps of:
   removing a portion of used liquid cooking medium from the cooking vessel;
   channeling the portion of cooking medium to a treatment vessel;
   subjecting the cooking medium in the treatment vessel to a pressure substantially greater than ambient atmospheric pressure;
   heating the cooking medium in the treatment vessel to a temperature greater than an atmospheric pressure boiling point for a sufficient time to restore the cooking medium to a condition suitable for cooking; and
   returning the treated cooking medium from the treatment vessel to the cooking vessel.

2. The method recited in claim 1, wherein the pressure in the treatment vessel comprises a level of at least 1.25 atm.

3. The method recited in claim 1, wherein the used cooking medium comprises an aqueous liquid having a starch therein.

4. The method recited in claim 3, wherein the used cooking medium has a first viscosity upon entry into the treatment vessel and a second viscosity upon returning from the treatment vessel that is less than the first viscosity.

5. The method recited in claim 1, wherein the removing, channeling, subjecting, heating, and returning steps are repeated substantially continuously.

6. The method recited in claim 1, wherein the heating step further comprises heating for a sufficient time and to a sufficient temperature to subject the cooking medium to an environment conducive to reducing a level of microbial contamination in the cooking medium.

7. A method of cooking a food containing a starch comprising the steps of:
   placing the food to be cooked into a cooking vessel containing a liquid cooking medium;
   heating the liquid cooking medium to cook the food;
   removing a portion of used liquid cooking medium from the cooking vessel;
   channeling the portion of cooking medium to a treatment vessel;
   subjecting the cooking medium in the treatment vessel to a pressure substantially greater than ambient atmospheric pressure;
   heating the cooking medium in the treatment vessel to a temperature greater than an atmospheric pressure boiling point for a sufficient time to restore the cooking medium to a condition suitable for cooking; and
   returning the treated cooking medium from the treatment vessel to the cooking vessel.

8. The method recited in claim 7, wherein the pressure in the treatment vessel comprises a level of at least 1.25 atm.

9. The method recited in claim 7, wherein the used cooking medium comprises an aqueous liquid having a starch leached from the food therein.

10. The method recited in claim 9, wherein the used cooking medium has a first viscosity upon entry into the treatment vessel and a second viscosity upon returning from the treatment vessel that is less than the first viscosity.

11. The method recited in claim 7, wherein the removing, channeling, subjecting, heating, and returning steps are repeated substantially continuously.

12. The method recited in claim 7, wherein the heating step in the treatment vessel further comprises heating for a sufficient time and to a sufficient temperature to subject the cooking medium to an environment conducive to reducing a level of microbial contamination in the cooking medium.

13. A method for reducing an amount of liquid cooking medium required to cook a plurality of batches of a food product therein, the method comprising the steps of:

placing food to be cooked into a cooking vessel containing a predetermined amount of liquid cooking medium;

heating the liquid cooking medium to a temperature sufficient to cook the food;

removing the food from the cooking vessel;

removing a portion of used liquid cooking medium from the cooking vessel;

channeling the removed cooking medium portion to a treatment vessel;

subjecting the cooking medium in the treatment vessel to a pressure substantially greater than ambient atmospheric pressure;

heating the cooking medium in the treatment vessel to a temperature greater than an atmospheric pressure boiling point for a sufficient time to restore the cooking medium to a condition suitable for cooking;

returning the treated cooking medium from the treatment vessel to the cooking vessel; and adding an amount of additional liquid cooking medium to the cooking vessel to restore the cooking medium to the predetermined amount, the amount less than the portion removed in the removing step.

14. The method recited in claim 13, wherein the pressure in the treatment vessel comprises a level of at least 1.25 atm.

15. The method recited in claim 13, wherein the used cooking medium comprises an aqueous liquid having a starch leached from the food therein.

16. The method recited in claim 15, wherein the used cooking medium has a first viscosity upon entry into the treatment vessel and a second viscosity upon returning from the treatment vessel, the second viscosity less than the first viscosity.

17. The method recited in claim 13, wherein the used liquid cooking medium portion removing, channeling, subjecting, heating, and returning steps are repeated substantially continuously.

18. The method recited in claim 13, wherein the heating step in the treatment vessel further comprises heating for a sufficient time and to a sufficient temperature to subject the cooking medium to an environment conducive to reducing a level of microbial contamination in the cooking medium.

* * * * *